US011825556B2

(12) United States Patent
Lu et al.

(10) Patent No.: US 11,825,556 B2
(45) Date of Patent: Nov. 21, 2023

(54) FREQUENCY BAND SCAN IN USER EQUIPMENT

(71) Applicant: GOOGLE LLC, Mountain View, CA (US)

(72) Inventors: Lynn Lu, Mountain View, CA (US); Shivank Nayak, Mountain View, CA (US); Rukun Mao, Mountain View, CA (US); Qin Zhang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/863,943

(22) Filed: Apr. 30, 2020

(65) Prior Publication Data
US 2020/0359200 A1    Nov. 12, 2020

Related U.S. Application Data

(60) Provisional application No. 62/846,456, filed on May 10, 2019.

(51) Int. Cl.
*H04W 8/26* (2009.01)
*H04W 8/18* (2009.01)
(Continued)

(52) U.S. Cl.
CPC ............. *H04W 8/26* (2013.01); *H04W 8/183* (2013.01); *H04W 8/20* (2013.01); *H04W 48/18* (2013.01); *H04W 84/042* (2013.01)

(58) Field of Classification Search
CPC ......... H04W 8/26; H04W 8/183; H04W 8/20; H04W 84/042; H04W 48/18
See application file for complete search history.

(56) References Cited

U.S. PATENT DOCUMENTS 7,167,707 B1   1/2007   Gazzard et al.
9,686,670 B2   6/2017   Ljung
(Continued)

FOREIGN PATENT DOCUMENTS

CN   102045812 A * 5/2011   ............ H04W 48/20
CN   106162824 A   11/2016
EP   1848231 A1   10/2007

OTHER PUBLICATIONS

Office Action for Taiwan Application No. 109115438, dated Feb. 17, 2021.
(Continued)

*Primary Examiner* — Wayne H Cai
(74) *Attorney, Agent, or Firm* — MARSHALL, GERSTEIN & BORUN LLP

(57) ABSTRACT

At switch-on or when recovering from lack of coverage, a UE determines first frequency bands corresponding to an initial MCC of a country in which the UE currently is located (402). The frequency bands include a first set of frequency bands associated with a network carrier to which the UE is subscribed and a second set of frequency bands not associated with the network carrier (404). The UE scans the first set of frequency bands (406). In response to detecting a new MCC and determining that no service is available within the first set of frequency bands (408), the UE scans a third set of frequency bands preferred by the UE within a second plurality of frequency bands corresponding to the new MCC (410). In response to determining that no service is available within the third set of frequency bands, the UE scans the second set of frequency bands (412).

20 Claims, 4 Drawing Sheets

(51) Int. Cl.
  *H04W 48/18*   (2009.01)
  *H04W 8/20*    (2009.01)
  *H04W 84/04*   (2009.01)

(56) References Cited

U.S. PATENT DOCUMENTS

| | | | |
|---|---|---|---|
| 9,942,816 B2 | 4/2018 | Wirtanen et al. | |
| 10,045,287 B1* | 8/2018 | Kavuri | H04W 48/14 |
| 2006/0079224 A1 | 4/2006 | Welnick et al. | |
| 2006/0160532 A1 | 7/2006 | Buckley et al. | |
| 2006/0234705 A1 | 10/2006 | Oommen | |
| 2012/0309391 A1* | 12/2012 | Zhang | H04W 48/16 |
| | | | 455/432.1 |
| 2013/0028119 A1* | 1/2013 | Ben-Eli | H04W 48/16 |
| | | | 370/252 |
| 2013/0225164 A1 | 8/2013 | Buckley et al. | |
| 2015/0056985 A1* | 2/2015 | Swaminathan | H04W 8/02 |
| | | | 455/434 |
| 2015/0341846 A1* | 11/2015 | Shi | H04W 64/00 |
| | | | 455/434 |
| 2016/0337946 A1* | 11/2016 | Kim | H04W 48/18 |

OTHER PUBLICATIONS

"3rd Generation Partnership Project; Technical Specification Group Core Network and Terminals; Non-Access-Stratum (NAS) functions related to Mobile Station (MS) in idle mode (Release 16)," 3GPP TS 23.122 (2019).

Chou et al., "Utilizing Supported Band Grouping and Display of Partial Search Results to Expedite Manual PLMN Selection Procedure," Technical Disclosure Commons (2019).

Lin et al., "Public Land Mobile Network Selection During International Roaming," Technical Disclosure Commons (2019).

Search Report for Application No. GB2006607.2, dated Oct. 12, 2020.

First Examination Report for India Application No. 202044019242, dated Jun. 28, 2021.

Office Action for German Application No. 102020112691.3, dated Aug. 5, 2021.

* cited by examiner

FREQUENCY BAND SCAN IN USER EQUIPMENT

CROSS-REFERENCE TO RELATED APPLICATION

The present application is a non-provisional application claiming priority to U.S. Provisional Patent Application No. 62/846,456, filed May 10, 2019, the disclosure of which is incorporated herein by reference in its entirety for all purposes.

FIELD OF THE DISCLOSURE

This disclosure relates generally to wireless communications and, more particularly, to scanning frequency bands at power-up or when recovering from lack of coverage to find wireless service.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a UE attempts to obtain wireless service at power-up or when recovering from lack of coverage, the UE scans frequency bands until the UE successfully selects a wireless network. The number of potentially available frequency bands can be very large, especially when the UE supports multiple radio access technologies (RATs). When the UE scans fewer frequency bands in a relatively large set of available bands, the UE expends less time and power, but the likelihood that the UE fails to locate a serving cell increases. On the other hand, if the UE scans more frequency bands, it is more likely that the UE will acquire service when service is available, but power consumption and delays statistically increase.

According to the approach currently incorporated into the 3GPP standard TS 23.122, version 16.1.0, a UE searches for service by scanning all the frequency bands which the hardware of the UE can scan, i.e., the supported frequency bands. More specifically, the UE first scans all the supported frequency bands to determine whether a network is available. When the UE detects a signal in a frequency band, the UE measures a Reference Signal Received Power (RSRP) to identify the frequency band with the strongest signal. The UE then attempts to establish downlink cell-level synchronization. For a certain frequency band, the UE acquires a synchronization signal (a Primary Synchronization Signal (PSS) or a Secondary Synchronization Signal (SSS)) transmitted at the center of the corresponding frequency band. Using the synchronization signal, the UE can determine the physical cell identity (PCI) as well as slot and frame timing. Upon establishing downlink cell-level synchronization, the UE acquires system information to establish complete downlink synchronization with the cell. The system information includes a Master Information Block (MIB), which indicates, among other parameters, system bandwidth, the size and duration of the Physical Hybrid-ARQ Indicator Channel (PHICH), and a system frame number. The UE can use the information in the MIB to process System Information Blocks (SIBs)pf various enumerated types (type 1, type 2, etc.) that provide parameters related to access, scheduling information of other SIBs, etc.

Using the SIB information, the UE can proceed to operator selection. The UE can obtain from the SIB transmissions cell selection parameters including the public land mobile network (PLMN) identity (ID) of the network. The PLMN ID consists of a mobile country code (MCC) and a mobile network code (MNC). When the UE determines that it can use the PLMN with the PLMN ID included in a SIB broadcast, the UE further checks cell barring (i.e., an indication that the UE is not allowed to use the cell), and signal strength. When the cell satisfies these criteria, the UE acquires SIB type 2 information to begin uplink synchronization with the network.

Because the hardware of a typical UE today supports all the frequency bands deployed around the world, the UE potentially scans a large number of frequency bands, which consumes a significant amount of power and generates long delays.

SUMMARY

The techniques of this disclosure allow a UE to efficiently perform network selection for service at switch-on or when recovering from lack of coverage. According to these techniques, the network selection is both location-aware and subscription aware. More particularly, the UE prioritizes frequency bands that carriers use at the current location of the UE, and also prioritizes frequency bands that the carrier to which the UE is subscribed uses in the home country of the UE or in roaming countries.

These techniques allow the UE to operate more efficiently by expending less energy when scanning radio frequency bands (more particularly, by statistically reducing the number of frequency bands the UE must scan per network selection procedure and reducing the amount of switching between frequencies). Further, the UE of this disclosure spends less computing power processing signals at various frequency bands. Still further, the techniques of this disclosure statistically reduce the amount of time the UE spends looking for wireless service upon switch-on or after a period of no coverage.

According to some implementations, the UE stores, in a local memory, sets of frequency bands for one or more carriers. Because a carrier can have multiple public land mobile networks (PLMNs), the local memory can store a respective list of PLMNs for each carrier, and a respective list of frequency bands for each of the PLMNs. The local memory also can store a respective list of frequency bands for each of one or more mobile country codes (MCCs). Further, the local memory can store lists of neighboring MCCs.

During a multi-step scan procedure, the UE first attempts to find service within the frequency bands of the carrier to which the UE is subscribed or, when the UE is roaming, the frequency bands of a preferred PLMN. The UE detects an MCC, which indicates the country in which the UE presently is located, and first scans home public land mobile network (HPLMN) frequency bands when the UE is located in the home country, or most preferred PLMN bans when the UE is in a roaming country.

In some cases, the UE will detect a new MCC during the first scan. In this case, rather than scanning the remaining frequency bands within the initial MCC, the UE at step two of the multi-step scan procedure scans the preferred frequency bands of the new MCC.

If the UE still fails to obtain service, the UE at step three scans the remaining frequency bands of the initial MCC. The UE in some implementations skips the already-scanned frequency bands (e.g., those that overlap the new MCC). If the UE fails to obtain service at step three, the UE scans the remaining frequency band within the scan capability of the UE.

One example embodiment of these techniques is a method in a UE for performing network selection for wireless service at switch-on or when recovering from lack of coverage. The method can be executed by processing hardware (which can include one or more processors) and includes determining first frequency bands corresponding to an initial MCC of a country in which the UE currently is located. The frequency bands include a first set of frequency bands associated with the UE's network service provider to which the UE is subscribed and a second set of frequency bands not associated with the network carrier. The method scans the first set of frequency bands. In response to detecting a new MCC during this initial scan (and determining that no service is available within the first set of frequency bands scanned so far), scanning a third set of frequency bands preferred by the UE within second frequency bands corresponding to the new MCC; and in response to determining that no service is available within the third set of frequency bands, scanning the second set of frequency bands.

Another embodiment of these techniques is a user device including processing hardware including one or more processors, radio circuitry, and a non-transitory computer-readable memory storing instructions that, when executed by the processing hardware, cause the user device to implement the method above.

The techniques of this disclosure for band configuration for PLMN search also can be summarized as the following sequence of steps. Step 1: If RPLMN or equivalent PLMN is available at the current location, which is determined through the detected MCC, proceed to step 2. Otherwise, the UE starts applying bands of detected MCC for the search and proceeds to step 3 after the instant (first) step. Step 2: the UE starts applying bands of RPLMN or equivalent PLMN for the search. If registration on RPLMN succeeds, the UE ends the search; otherwise, the UE proceeds to step 3. Step 3: if the list of available PLMN(s) becomes empty, the UE proceeds to step 4; otherwise, the UE selects the next PLMN from the list of available PLMN(s). The UE applies the bands of the selected PLMN if configured, otherwise the UE applies the bands of the detected MCC. If registration cannot be achieved, the UE repeats step 3 until all available PLMN(s) have been attempted. Step 4: the UE continues to search for the targeted PLMN with any UE-capable bands that have not yet been applied.

Further, if the UE finds a PLMN in a new MCC (different from detected MCC), and the preferred PLMN (HPLMN/EHPLMN) is configured for the new MCC, the UE can have the option of applying bands from this preferred PLMN that has not been used in step 2, and performing another round of search for RPLMN. Still further, when available PLMNs are from different MCCs, and the selected PLMN is not from the detected MCC, and if the bands of the detected MCC are not configured, the UE can use the bands of the selected PLMN rather than the bands of the detected MCC.

DETAILED DESCRIPTION OF THE DRAWINGS

Figure 1:
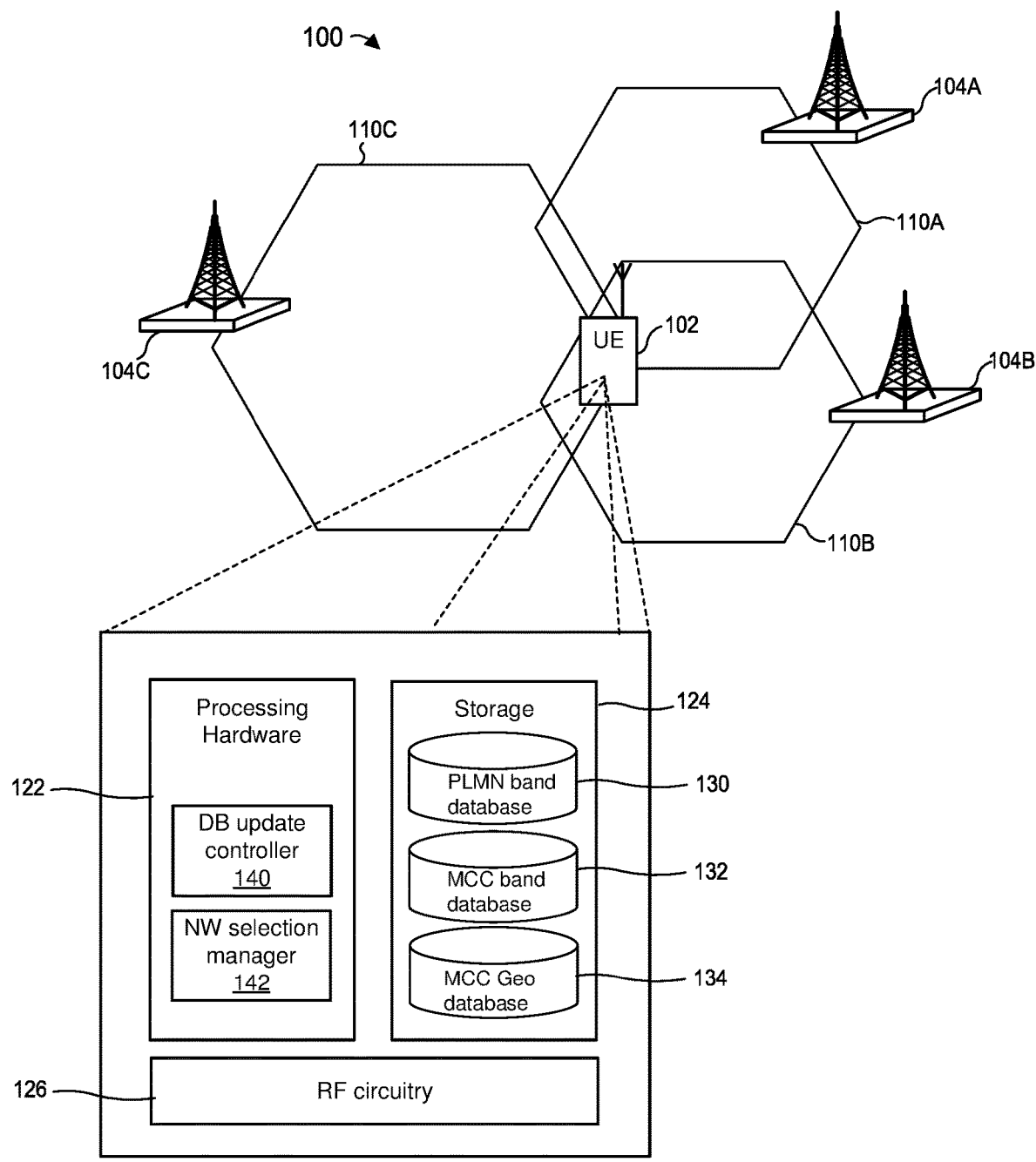
FIG. 1 is a block diagram of an example wireless communication network in which a UE can use the frequency band scanning techniques of this disclosure.

FIG. 1 depicts an example wireless communication system 100 in which a UE 102 can implement the network selection techniques of this disclosure. As discussed in detail below, the UE 102 performs network selection in a manner that is both location-aware and subscription aware. To this end, the UE 102 conducts the scan procedure as a sequence of steps, so that successfully completing registration at one step makes it unnecessary for the UE 102 to continue scanning frequency bands in subsequent steps, and the UE 102 accordingly can terminate the procedure early. The UE 102 prioritizes the steps so that the importance of each subsequent steps decreases relative to the previous step, at least because the probability of finding service during the first step is higher than the probability of finding service during the second step, etc. Further, the UE 102 initially scans a relatively small set of frequency bands and then gradually expands the set, so as to better achieve a balance between performance and cost in terms of power, time, etc.

The network 100 in this example configuration can include a base station 104A that supports a cell 110A, a base station 104B that supports a cell 110B, a base station 104C that supports a cell 110C, etc. In various configurations of the network 100, the base station 104A can be an Evolved Node B (eNB) supporting an Evolved Universal Terrestrial Radio Access (EUTRA) cell and connected to an Evolved Packet Core (EPC) of an LTE network, a next-generation evolved Node B (ng-eNB) supporting a EUTRA cell and connected to a 5G core network (5GC), a 5G Node B (gNB) supporting an NR cell and connected to a 5GC of a 5G network, etc. More generally, the base station 104A can implement any suitable RAT and operate in any suitable radio access network (RAN) connected to any suitable core network (CN). The base stations 104B and 104C can be implemented similar to the base station 104A or, in some implementation, operate according to different RATs, in the same or different network.

Further, in some implementations the base stations 104A-C operate in different networks associated with different wireless carriers. Thus, when the UE 102 is located in a geographic area in which the cells 110A-C of different wireless carriers overlap, the UE 102 can select the network with which the UE 102 registers at least partially based on the order in which the UE scans the respective frequency bands of these networks.

The UE 102 includes processing hardware 120 that can include one or more general-purpose processors such as central processing units (CPUs) and non-transitory computer-readable memory storing machine-readable instructions executable on the one or more general-purpose processors, and/or special-purpose processing units. The UE 102 further includes a non-transitory storage 124 which can be integral with the processing hardware 120 or provided separately from the processing hardware 120. Still further, the UE 102 in this implementation includes a radio frequency (RF) circuitry (or simply "radio circuitry") 126 configured to transmit and receive radio signals.

The storage 124 can store a PLMN band database 130, an MCC band database 132, and an MCC Geo database 134. Although illustrated as separate databases in FIG. 1, the databases 130-134 in other implementations can correspond to different tables in a single relational database. In another implementation, the databases 130-134 are locally stored files. In some implementations, the modem software of the UE 102 (not shown to avoid clutter) receives a configuration file that initializes the databases 130-134. The UE can receive the information in the databases 130-134 from the wireless carrier upon provisioning, during an over-the-air update, during the initial scan, upon user request (e.g., prior to the user taking the UE 102 overseas), upon a request from the service provider (e.g., after adding or removing base stations), or in any other suitable manner. In general, at least some of the information in the databases 130-134 can be dynamic.

An entry in the PLMN band database 130 can have the format of {Carrier: <band list>}. Because a carrier can have multiple PLMNs, the PLMN band database 130 in some implementations can store records in the format {<PLMN list>: <band list>}. The identifier of each PLMN, or the PLMN ID, can be a concatenation of an MCC and mobile network code (MNC). The PLMN band database 130 can use PLMN IDs for indexing, for example. An entry in the MCC band database 132 can have the format of {MCC: <band list>}. An MCC band can be the union of PLMN bands for a given country. The Geo database 134 can store neighboring country or MCC information for countries or MCCs. The databases 130-134 thus store identities of various PLMNs, configuration data for the corresponding frequency bands such as RAT type, for example. If desired, the UE 102 can store indications of various relationships between the databases 130-134 so that, for example, the network selection manager 142 can retrieve a list of PLMNs (rather than frequency bands) for a certain specified MCC. The databases 130-134 also can store indications of which frequency bands the UE 102 prefers in various countries.

The processing hardware 120 in an example implementation includes a database update controller 140 configured to update lists of frequency bands. For example, after a wireless carrier recently deployed a new band, or when the initial configuration of the databases 130-134 erroneously omitted one of the bands, the UE 102 can camp on a certain frequency band and determine that the frequency band is not listed in the databases 130-134. The database update controller 122 in response can update one or more databases. Further, the database update controller 122 in some cases reports the update(s) to the network.

The processing hardware 120 further includes a network selection manager 142. In operation, the network selection manager 142 can use the databases 130, 132, and 134 to conduct a multi-step scan procedure to find wireless service for the UE 102. In addition to the configuration in the databases 130-134, which the UE 102 in some cases can update dynamically as discussed above, the network selection manager 142 also can utilize certain permanent parameters of the UE 120, such as the scan capability (the range of radio frequencies which the UE 102 is capable of using to transmit or receive information) and other hardware configuration.

An example method 200 which the network selection manager 142 can execute at power-up (also referred to as "switch-on") or when the UE 102 recovers from lack of coverage for example is discussed next with reference to FIG. 2 and the diagrams of FIGS. 3A-D. For simplicity, the discussion of FIG. 2 below refers to the UE 102 rather than to the network selection manager 142 specifically. The discussion also refers to the wireless carrier $C_N$ to which the UE 102 subscribes in the scenario of FIG. 2.

At block 202, the UE 102 detects the current MCC using system information block (SIB) broadcasts in a cell (any first PLMN detected through SIB includes MCC information, so the UE 102 can scan for MCC information much more quickly than scanning for full service), a previously stored configuration, positioning data (e.g., a positioning fix from the global positioning service (GPS), wireless local area network (WLAN) beacons, wireless personal area network (WPAN) beacons), etc. Because the UE 102 at some point may detect another MCC as discussed below, this disclosure refers to the MCC detected at block 202 as the initial MCC.

Next, the UE 102 at block 204 determines whether a registered PLMN (RPLMN) or an equivalent PLMN is affiliated with the initial MCC. If RPLMN, HOME equivalent PLMN of the UE, or a preferred PLMN is available (the UE 102 can retrieve this information from the databases 130-134), the flow proceeds to block 206 to prioritize certain frequency bands of the MCC. Otherwise, if the RPLMN or an equivalent PLMN is not available, the flow proceeds to block 222, where the UE 102 begins to search through all the frequency bands of the MCC.

Thus, the UE 102 at block 204 determines whether the search for wireless service should first encompass a set of frequency bands associated with the wireless carrier $C_N$ or should proceed to searching the entire set of frequency bands associated with the initial MCC. Searching through the frequency bands associated with the wireless carrier $C_N$ can be referred to as a PLMN band scan, and searching through the frequency bands associated with the initial MCC can be referred to as an MCC band scan (or an MCC remaining band scan when the UE 102 has already searched through some of the PLMN bands and excludes these from the MCC band scan).

Figure 3A:
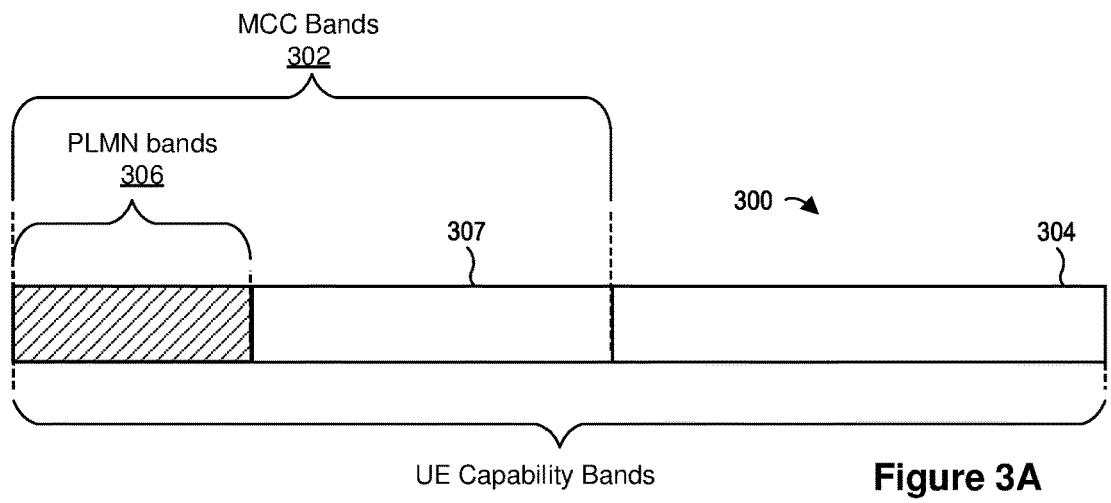
FIG. 3A is a block diagram illustrating the first step of the multi-step scan procedure, during which the UE located in a country with a certain MCC scans those of the MCC bands that are allocated to the carrier of the UE, or which the UE prefers in a roaming country.

Referring for clarity to FIG. 3A, a range of frequency bands 300 corresponds to the entire scan capability of the UE 102. Because the hardware of the UE 102, such as the RF circuitry 126, limits the range 300, the frequency bands in this range can be referred as to "HW/RF" bands. The range 300 includes a set 302 of initial MCC bands 302, which in turn includes a set 306 of PLMN bands 306 and a set 307 of the remaining frequency bands within the set of initial MCC bands 302. FIG. 3A also depicts a set 304 that includes all the frequency bands in the range 300 that are not in the initial MCC bands set 302 (in other words, the range 300 is a concatenation of the sets 302 and 304). The set 306 includes all the frequency bands of the service provider supporting the UE 102, for a particular country with the $MCC_N$. The set 302 includes all the frequency bands deployed in a particular country such as the USA or Canada referred to in the example below.

The sets 302 and 306 in FIG. 3A are not drawn to scale relative to each other or to the range 300, and in general the set 306 can occupy a larger or smaller portion of the range 300, and similarly the set 302 can occupy a larger or smaller portion of the range 300. Further, the databases 130-134 in some implementations do not store complete configurations for the range 300 or the sets 302, 304, and the UE 102 in some cases updates entries in the databases 130-134, or creates new entries. Although the bands are depicted as contiguous for ease of understanding, frequency bands in the same MCC bands 302, PLMN bands 306, and other bands 304 can be discontinuous or non-adjoining.

Referring again to FIG. 2, at block 206, the UE 102 searches for wireless service through the frequency bands of the RPLMN or the equivalent PLMN. To this end, the UE 102 can retrieve a list of PLMNs of the carrier $C_N$ from the databases 130-134. When the UE 102 operates in its home country, the UE 102 can utilize the frequency bands of the home public land mobile network (HPLMN). When the UE 102 is roaming internationally, the UE 102 can first identify the most preferred PLMN in the roaming MCC. To this end, the UE 102 check the lists of equivalent HPLMNs, operator controlled PLMNs (OPLMNs), and/or user PLMNs (UPLMNs). The UE 102 then can retrieve frequency bands for the one or more PLMNs of these types from the databases 130-134.

In some implementations, the UE 102 applies the frequency bands of the RPLMN at step 206 when the following conditions are satisfied: the UE 102 previously obtained wireless service in the country of the initial MCC (as the home country or a roaming country); the UE 102 powers up and determines that the location has not changed, i.e., the location reading is consistent with the most-recently used MCC; and the frequency bands for the RPLMN are available in the one or more databases 130-134. The UE 102 at block 206 sequentially attempts, for each frequency band the UE 102 selects, to perform registration in order to obtain wireless service.

At block 208, the UE 102 determines whether the registration attempt with the RPLMN or the equivalent PLMN was successful. The UE 102 completes the method 200 if the registration was successful. Otherwise, the UE 102 determines at block 210 whether an RPLMN or equivalent PLMNs are available and, if so, selects the next RPLMN or the equivalent PLMN at block 212. The flow then returns to block 206. Blocks 206, 208, 210, and 212 thus are associated with the PLMN band scan of the multi-step procedure.

However, the flow proceeds to block 214 if the UE 102 determines at block 210 that no more equivalent PLMNs are available. At block 214, the UE 102 determines whether it detected a new MCC different from the initial MCC. If the UE 102 detected a new MCC during the search block 206, the flow proceeds to block 216. Otherwise, the flow proceeds to block 222, where the UE 102 begins the MCC remaining band scan.

At block 216, the UE 102 searches through some of the bands of the new MCC. These bands can be referred as PLMN delta bands and include the frequency bands of the most preferred PLMN in the new MCC, which the UE 102 has not yet scanned during the scan round (i.e., since executing the functionality of block 202). The databases 130-134 can store indications of preferred PLMNs for various MCCs. As one example, when the HPLMN provides wireless service on a delta frequency band of the new MCC, the UE 102 can scan the delta frequency band at block 216 and attempt to obtain wireless service. As another example, a preferred PLMN that is not the HPLMN may be providing wireless service on a delta frequency band of the new MCC, and the UE 102 similarly can scan this delta frequency band. More generally, the UE 102 at block 216 can search through the bands of a preferred PLMN that may be an HPLMN or an equivalent EHPLMN having the new MCC.

At block 218, the UE 102 determines whether the registration attempt within one of the PLMN delta bands was successful. The UE 102 completes the method 200 if the registration was successful. Otherwise, the UE 102 determines at block 220 whether more new MCCs are available and, if so, returns the flow to block 216 to scan the preferred PLMN bands of the other new MCC. If the UE 102 has not detected any more new MCCs, the flow proceeds to block 222.

Figure 3B:
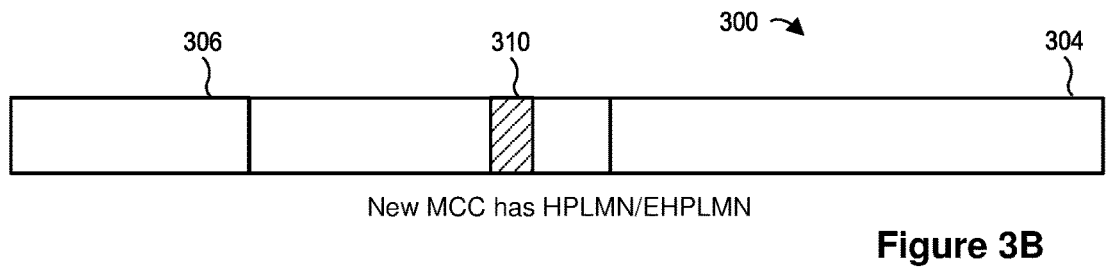
FIG. 3B is a block diagram illustrating the second step of the multi-step scan procedure, during which the UE detects a new MCC and scans preferred frequency bands of the new MCC.

Now referring to FIG. 3B, a set 310 of HPLMN or EHPLMN frequency bands can correspond to a portion (or possible the entirety) of the range of the frequency bands of the new MCC, which in turn is within the range of frequency bands 300. As illustrated in FIG. 3B, the set 310 can be non-adjacent to the set 306 which the UE 102 previously scanned. In some cases, however, it is possible for the sets 306 and 310 to be contiguous.

For further clarity, this disclosure briefly considers an example scenario in which the UE 102 reduces the amount of time the UE 102 spends on the scan as well as the amount of power by performing the functions of block 216. The UE 102 in this example scenario is a Canadian device (e.g., the UE 102 subscribes to a Canadian wireless carrier and has a Canadian subscriber identity module (SIM)). The UE 102 powers-on while on the US side of the US-Canada border and detects, at block 202, the US MCC as the initial MCC. The UE 102 first completes a PLMN band scan of block 206-212 but does not obtain service. However, the UE 102 during the PLMN band scan detects a Canadian cell that has an overlap with the US, and thus detects a new MCC (the Canadian MCC). The UE 102 then scans, at block 216, the HPLMN frequency bands the UE has not yet scanned, and quickly finds service with the UE's "home" wireless carrier.

Referring back to FIG. 2, at block 222 the UE 102 scans the remaining frequency bands of the initial MCC and, if one or more new MCCs have been detected, the remaining preferred or "PLMN delta" frequency bands of the new MCCs. To identify the remaining frequency bands, the UE 102 can query the databases 130-134 and exclude the frequency bands scanned since the beginning of the scan round. The UE 102 in this implementation however does not re-scan the frequency bands the UE 102 scanned at blocks 206 or 216. In this manner, the UE 102 can find preferred service when the PLMN band data of the UE 102 is not entirely accurate, and some of the PLMN bands are missing from the database 130 when the UE 102 performs the scan at block 206. Further, scanning the remaining frequency bands of the MCC(s) allows the UE 102 to find wireless service on a roaming network, when wireless service is available.

Figure 3C:
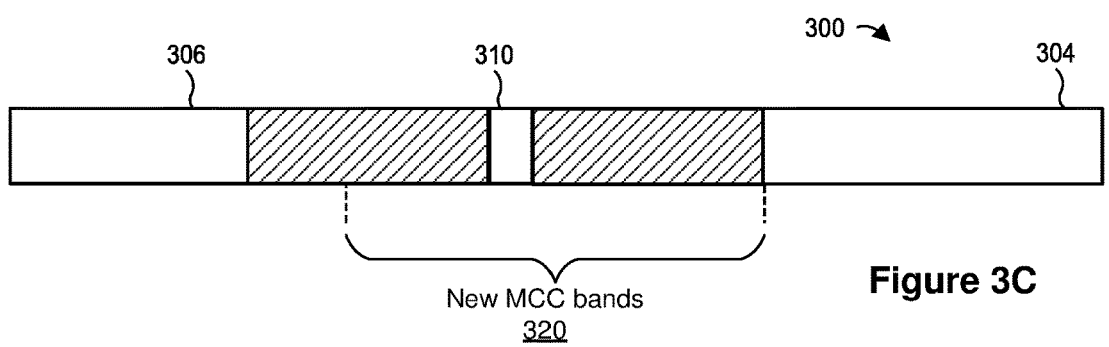
FIG. 3C is a block diagram illustrating the third step of the multi-step scan procedure, during which the UE scans the remaining frequency bands of the MCC.

To depict the scan at block 222 schematically, FIG. 3C illustrates the frequency bands the UE 102 scans at block 222 as a shaded region 320 within the range 300. This region includes a union of the initial MCC bands and the new MCC bands (which can overlap), but excludes the previously scanned sets 306 and 310.

Referring again to FIG. 2, the UE 102 at block 224 determines whether the registration attempt at block 222 was successful. The UE 102 completes the method 200 if the registration was successful. Otherwise, the flow proceeds to block 226.

Figure 3D:
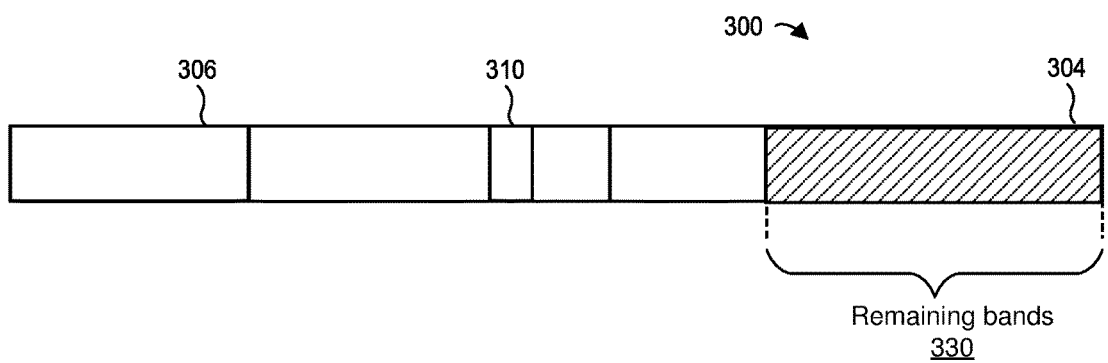
FIG. 3D is a block diagram illustrating the fourth step of the multi-step scan procedure, during which the UE scans the remaining frequency bands within the scan capability of the UE.

At block 226, the UE 102 scans the remaining frequency bands within the scan capability of the UE 102. FIG. 3D illustrates these remaining frequency bands as a shaded region 330 within the range 300. The remaining frequency bands 330 in this scenario correspond to the range 300 without the frequency bands scanned at blocks 206, 216, or 222.

Referring generally to FIGS. 2 and 3A-3D, the UE 102 in some implementations can implement additional conditions when performing a multi-step scan procedure of this disclosure. For example, the UE 102 can specify a targeted PLMN for each scan round, so that the lower layers of the radio protocol stack (e.g., radio resource control (RRC) or L1), the firmware, or the radio circuitry 126 are permitted to automatically camp only on the targeted PLMN. For all other PLMNs (except, in some implementations, for HPLMN or EHPLMN), the RRC sublayer or another lower layer must report the PLMNs found in the course of the procedure discussed above to an upper layer (e.g., the non-access stratum (NAS) layer). The upper layer then can send another service request, with a new targeted PLMN, to the lower layer.

Figure 4:
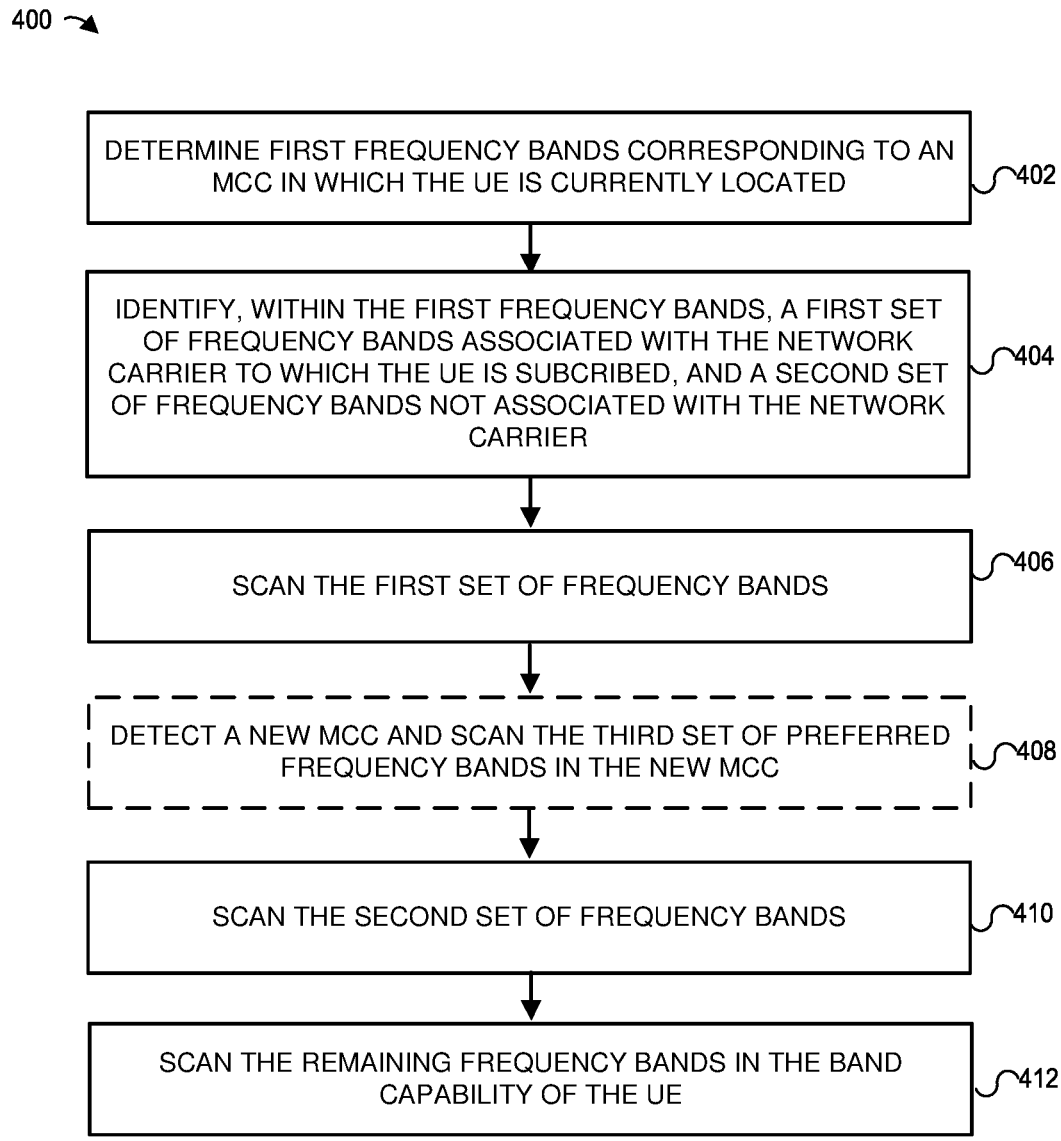
FIG. 4 is a flow diagram of an example method for performing network selection for wireless service, which the UE of this disclosure can implement.

For further clarity, FIG. 4 illustrates an example method 400 for performing network selection for wireless service, which the UE 102 or another suitable device can implement.

The method 400 begins at block 402, where the UE 102 determines first frequency bands corresponding to an initial MCC in which the UE 102 currently is located (see blocks 202 and 204; see also set 302 in FIG. 3A).

At block 404, the UE 102 identifies, within the first frequency bands, a first set of frequency bands (see set 306 in FIG. 3A) associated with the network carrier to which the UE 102 is subscribed, and a second set of frequency bands not associated with this UE's carrier (see set 307 in FIG. 3A).

Figure 2:
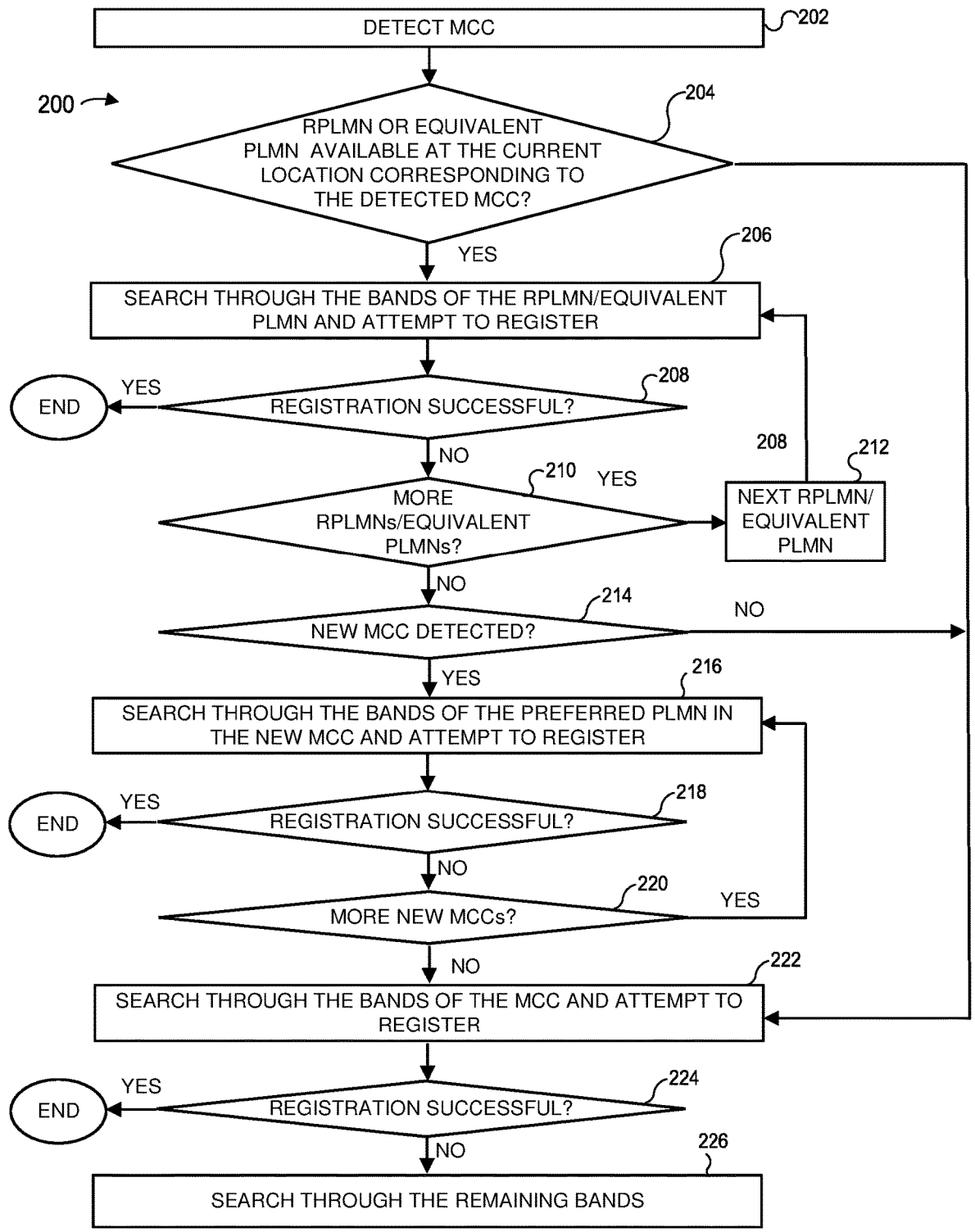
FIG. 2 is a flow diagram of an example multi-step scan procedure the UE of this disclosure can implement to perform network selection for wireless service.

At block 406, the UE 102 scans the first set of frequency bands (see block 206 of FIG. 2; see also set 306 in FIG. 3A).

At block 408, the UE 102 performs the optional step 408. In particular, the UE 102 determines it has detected a new MCC different from the initial MCC (see block 214 of FIG. 2) and scans preferred frequency bands in the new MCC (see block 216 of FIG. 2; see also set 310 in FIG. 3B).

At block 410, the UE scans the second set of frequency bands. Also, if the UE 102 detected one or more new MCCs at block 408, the UE 102 at block 410 may skip the scanning of the frequency bands of the MCC that were previously scanned during this scan round (see block 222 of FIG. 2; see also set 320, excluding the subset 310, in FIG. 3C).

At block 412, the UE 102 scans the remaining frequency bands in the band capability of the UE 102 (see block 226 of FIG. 2; see also set 330 in FIG. 3D).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of aspects reflects another additional embodiment explicitly contemplated by the present disclosure.

Aspect 1. A method in a UE for performing network selection for wireless service at switch-on or when recovering from lack of coverage comprises determining, by processing hardware, a first plurality of frequency bands corresponding to an initial MCC, the plurality of frequency bands including a first set of frequency bands associated with a network carrier to which the UE is subscribed (e.g., HPLMN frequency bands when the MCC corresponds to the home country of the UE, or the most preferred frequency bands when the MCC is an international roaming MCC) and a second set of frequency bands not associated with the network carrier. The method further comprises scanning, by the processing hardware, the first set of frequency bands. In response to determining that no service is available within the first set of frequency bands, the method includes scanning the second set of frequency bands. Further, in response to determining that no service is available within the second set of frequency bands, the method includes scanning frequency bands within a scan capability of the UE but outside the first plurality of frequency bands.

Aspect 2. A user device comprising: processing hardware including one or more processors; radio circuitry; a non-transitory computer-readable memory storing thereon instructions that, when executed by the processing hardware, cause the user device to implement a method of aspect 1.

What is claimed is:

1. A method in a user equipment (UE) for performing network selection for wireless service at switch-on or when recovering from lack of coverage, the method comprising:

detecting an initial mobile country code (MCC), the initial MCC indicating a country in which the UE is currently located;

determining, by processing hardware, a first plurality of frequency bands corresponding to the initial MCC, the plurality of frequency bands including a first set of frequency bands associated with a network carrier to which the UE is subscribed and a second set of frequency bands not associated with the network carrier;

scanning, by the processing hardware, the first set of frequency bands; and in response to detecting a new MCC and determining that no service is available within the first set of frequency bands, scanning a third set of frequency bands preferred by the UE within a second plurality of frequency bands corresponding to the new MCC.

2. The method of claim 1, further comprising:
in response to determining that no service is available within the third set of frequency bands, scanning at least the second set of frequency bands.

3. The method of claim 2, including: scanning frequency bands within the second plurality of frequency bands that are not included in the third set of frequency bands.

4. The method of claim 1, further comprising:
determining that the initial MCC corresponds to a home country of the UE; and
using home public land mobile network (HPLMN) frequency bands as the first set of frequency bands.

5. The method of claim 1, further comprising:
determining that the initial MCC is an international roaming MCC; and
identifying most preferred frequency bands in the international roaming MCC, to be used as the first set of frequency bands.

6. The method of claim 5, wherein identifying the most preferred frequency bands in the international roaming MCC includes querying a local database implemented in a non-transitory memory of the UE.

7. The method of claim 5, wherein identifying the most preferred frequency bands in the international roaming MCC includes using at least one of (i) a list of equivalent HPLMN (EHPLMN) frequency bands, (ii) a list of operator controlled PLMN (OPLMN) frequency bands, or (iii) user PLMN (UPLMN) frequency bands.

8. The method of claim 1, wherein determining the first plurality of frequency bands includes:
determining at least one of: (i) the UE previously obtained wireless service in the country of the initial MCC, (ii) the initial MCC is an MCC of the registered PLMN (RPLMN), or (iii) the UE stores PLMN bands for the RPLMN; and
using RPLMN bands as the first plurality of frequency bands.

9. The method of claim 1, wherein:
scanning the first set of frequency bands, the second set of frequency bands, and the third set of frequency bands corresponds to a single scan round; and
scanning the third set of frequency bands preferred by the UE includes scanning only those frequency bands that have not yet been scanned since a beginning of the scan round.

10. The method of claim 1, wherein the new MCC is a first new MCC, the method further comprising:
detecting a second new MCC and scanning another set of frequency bands preferred by the UE within a third plurality of frequency bands corresponding to the second new MCC.

11. The method of claim 1, further comprising:
in response to detecting that no service is available within the second set of frequency bands, scanning a fourth set of frequency bands within a scan capability of the UE but outside each of the first plurality of frequency bands and the second plurality of frequency bands.

12. The method of claim 1, wherein scanning the third set of frequency bands preferred by the UE includes identifying frequency bands of a most preferred PLMN in the new MCC.

13. The method of claim 1, wherein determining the first plurality of frequency bands and determining the second plurality of frequency bands includes querying a local database implemented in a non-transitory memory of the UE.

14. The method of claim 13, wherein querying the local database includes:
retrieving, by the processing hardware, a respective list of frequency bands for an MCC, in response to specifying the MCC in a query.

15. The method of claim 13, wherein querying the local database includes:
retrieving, by the processing hardware, a respective list of PLMNs for the network carrier, in response to specifying the network carrier in a query.

16. The method of claim 13, wherein querying the local database further includes:
retrieving, by the processing hardware, a respective list of frequency bands for a PLMN, in response to specifying the PLMN in a query.

17. The method of claim 13, wherein querying the local database includes:
obtaining a list of MCCs of countries adjacent to the country of the initial MCC, in response to specifying the initial MCC in a query.

18. The method of claim 13, further comprising:
camping on a certain frequency band;
in response to determining that the certain frequency band is not listed in the local database, updating the local database to include the certain frequency band.

19. A user device comprising:
processing hardware including one or more processors;
radio circuitry;
a non-transitory computer-readable memory storing thereon instructions that, when executed by the processing hardware, cause the user device to:
detect an initial mobile country code (MCC), the initial MCC indicating a country in which the UE is currently located,
determine a first plurality of frequency bands corresponding to the MCC, the plurality of frequency bands including a first set of frequency bands associated with a network carrier to which the UE is subscribed and a second set of frequency bands not associated with the network carrier,
scan the first set of frequency bands, and
in response to detecting a new MCC and determining that no service is available within the first set of frequency bands, scan a third set of frequency bands preferred by the UE within a second plurality of frequency bands corresponding to the new MCC.

20. A non-transitory computer-readable medium comprising instructions that, when executed by processing hardware, cause a user device comprising the processing hardware to implement a method for performing network selection for wireless service at switch-on or when recovering from lack of coverage, the method comprising:

detecting an initial mobile country code (MCC), the initial MCC indicating a country in which the UE is currently located;

determining, by processing hardware, a first plurality of frequency bands corresponding to the initial MCC, the plurality of frequency bands including a first set of frequency bands associated with a network carrier to which the UE is subscribed and a second set of frequency bands not associated with the network carrier;

scanning, by the processing hardware, the first set of frequency bands; and in response to detecting a new MCC and determining that no service is available within the first set of frequency bands, scanning a third set of frequency bands preferred by the UE within a second plurality of frequency bands corresponding to the new MCC.

* * * * *